United States Patent Office 3,356,453
Patented Dec. 5, 1967

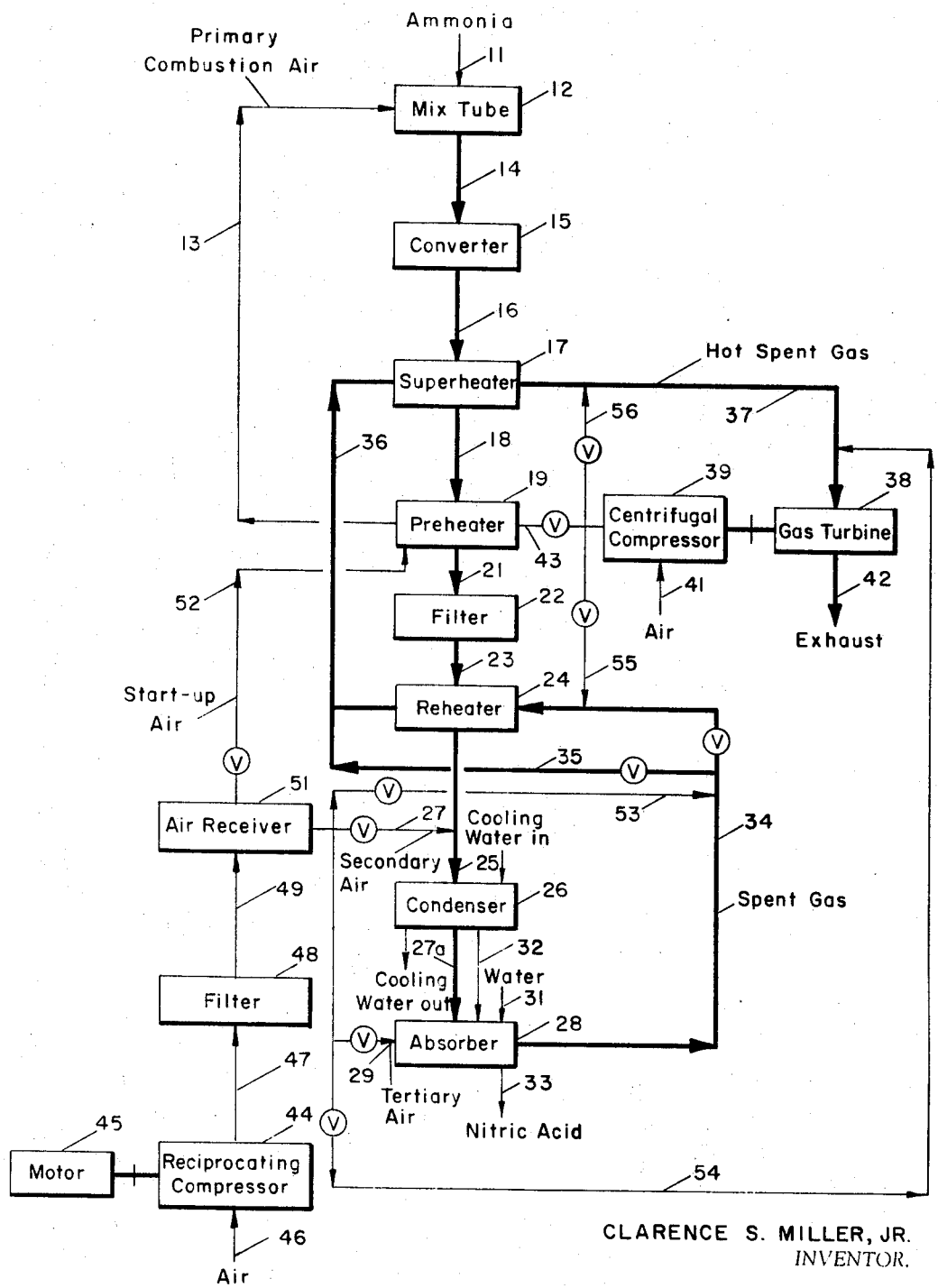
CLARENCE S. MILLER, JR.
INVENTOR.
BY
AGENT

3,356,453
AMMONIA OXIDATION PROCESS FOR
PRODUCTION OF NITRIC ACID
Clarence S. Miller, Jr., Kennett Square, Pa., assignor to
Hercules Incorporated, a corporation of Delaware
Filed Nov. 9, 1964, Ser. No. 409,650
2 Claims. (Cl. 23—162)

This invention relates broadly to the manufacture of nitric acid and, more specifically, to improvements in the manufacture of nitric acid by the ammonia oxidation process.

In the process for producing nitric acid by oxidation of ammonia to nitric oxide and further oxidation of the nitric oxide to nitrogen dioxide and absorption of the nitrogen dioxide in water to form nitric acid, air at superatmospheric pressure is introduced into the system at three points: (1) primary combustion air at the ammonia-air mixing chamber, (2) secondary air just before the condenser to complete oxidation of nitric oxide to nitrogen dioxide, and (3) tertiary air at the base of the absorption column principally to bleach the product acid. In all previous systems this compressed air has been supplied to all three points from a common air receiver.

In many of the older ammonia oxidation plants, a considerable number of which have been in operation for 35–40 years or more and are still in use, the compressed air required for the process has been provided by two reciprocating compressors. The first of these has been electric motor driven and provides approximately 60–65% of the necessary air. The second of these has been driven by a reciprocating gas expansion engine utilizing spent gas from the ammonia oxidation process reheated by indirect heat exchange with the hot gases of the ammonia oxidation and provides approximately 35–40% of the necessary air. This percentage has been defined as the power recovery efficiency of the system.

Although it has long been known that there is sufficient heat available from the combustion of the air-ammonia mixture to provide for 100% power recovery driven air compression, it has never been possible with reciprocating gas expansion engines to recover more than about 40% of the available power from the system. This is due primarily to the inability to satisfactorily lubricate the cylinders of a reciprocating gas expansion engine at temperatures above about 500° F. Moreover, air which is compressed with reciprocating compression engines is always contaminated with some oil, both in vapor form and as minute suspended droplets, even though oil filters are employed to remove oil. This oil contaminates the catalyst and necessitates frequent plant shut-downs for catalyst replacement and rejuvenation.

Furthermore, although it is well known that absorption efficiency is improved with higher absorption pressures, full advantage cannot be taken of this fact in these older existing plants since the pressure in the system is governed largely by the design capacity of the installed reciprocating compressors. For example, in many of these older ammonia oxidation plants the reciprocating compressors were designed for 110 p.s.i.g. discharge pressure. By minor, relatively inexpensive modifications the discharge pressure of these compressors has been raised to approximately 117 p.s.i.g. Although additional modifications to raise discharge pressures to still higher levels are possible, the excessive cost of such modifications, together with the uncertainty of how such modifications would affect the long-term future reliability of the thus-modified compressors, make such modifications unattractive. With discharge pressure of about 117 p.s.i.g., it is possible to maintain approximately 90 p.s.i.g. in the system at the absorber and about 70 p.s.i.g. in the spent gas. A pressure of at least about 110 p.s.i.g. at the absorber would be desirable.

Operators of these older ammonia oxidation plants have been confronted for many years with the problem of renovation of their plants to overcome these inherent shortcomings of the existing system. More concisely, the problem has been how to renovate the system in a manner which is economically feasible, retaining as much as possible of the existing costly and still very useful physical units of the system. While many improved systems have been proposed and devised to make fuller use of the available power in the ammonia oxidation gases, none of these heretofore have been economically attractive as a means for renovating existing plants utilizing reciprocating compressors.

It is the principal object of this invention, therefore, to provide improvements in an existing ammonia oxidation system which now utilizes reciprocating compressors to compress air required for the system, which improvements substantially overcome inherent shortcomings of the existing system, are economically attractive, and utilize substantially much greater amounts of the heat energy in the ammonia oxidation gases to provide power needed to compress air required by the system.

The invention is based on the discovery that this object and others can be met by compressing primary combustion air with a centrifugal compressor driven by a gas turbine which derives its power from spent gas from the ammonia oxidation process reheated by indirect heat exchange with the hot gases of the ammonia oxidation, compressing secondary and tertiary air with a motor-driven reciprocating compressor, and keeping the compressed primary combustion air separated from the compressed secondary and tertiary air.

Defined more concisely, the invention is an improvement in a process of making nitric acid wherein ammonia mixed with compressed primary combustion air is oxidized under pressure and the products of oxidation are cooled by successive passage through a series of heat exchangers and a condenser and are then contacted in countercurrent flow with water in an absorbing column to form nitric acid, and wherein compressed secondary air is mixed with the products of oxidation prior to passage through the condenser to oxidize nitric oxide to nitrogen dioxide and compressed tertiary air is introduced into the system in the absorption column principally to bleach the nitric acid, which improvement comprises compressing the primary combustion air with a centrifugal compressor driven by a gas turbine which derives its power from spent gas from the ammonia oxidation process reheated by indirect heat exchange with the hot gases of the ammonia oxidation, compressing the secondary and tertiary air with a motor-driven reciprocating compressor, and keeping the compressed primary combustion air separated from the compressed secondary and tertiary air.

Thus, the only major equipment change involved in practicing this invention is the replacement of the previously employed reciprocating gas expansion engine with its relatively poor power recovery efficiency (35–40%) and high maintenance costs with a gas turbine-powered centrifugal compressor characterized by a power recovery efficiency of between 75 and 80% and a much lower maintenance cost. Other major and costly units of the existing ammonia oxidation plant, such as the absorption tower and the motor-driven reciprocating compressor, continue usable in the renovated system with substantially no significant alteration. With a power recovery efficiency of 75–80%, which means that 75–80% of the compressed air required by the process can be supplied by the centrifugal compressor, all of the primary combustion air can be supplied from the centrifugal compressor, and secondary and tertiary air can be supplied from the motor-driven reciprocating compressors. The gas turbine is sized so as to make use of the total spent gas flow, and the centrifugal compressor is sized to match the horsepower developed by the gas turbine and to deliver air at pressures between about 125 and about 150 p.s.i.g. During start-up, a sufficient amount of air is delivered by the motor-driven reciprocating compressor units alone to light off the ammonia oxidation. As the spent gases are reheated and delivered to the gas turbine, power is available to start up the centrifugal compressor which then provides all of the primary combustion air and up to 80% of all the required air for the process. Part of the motor-driven reciprocating compressor units are then shut down, and the motor-driven reciprocating compressor is operated partially unloaded, but sufficient to provide the remaining 20–25% of the air required for the process, as secondary and tertiary air.

As indicated above, an important advantage derived from practice of this invention is a greatly improved power recovery from the system. This is due primarily to the fact that gas turbines do not have a cylinder lubrication problem to contend with, as is the case with reciprocating gas expansion engines. Hence, spent gases from the ammonia oxidation system reheated to much higher temperatures by indirect heat exchange with the hot gases of the ammonia oxidation can be employed to drive the gas turbine. For example, the approximate allowable maximum temperature of spent gases delivered to a reciprocating gas expansion engine is on the order of about 500° F. By contrast, spent gases reheated to temperatures in the range of 1,100° F.–1,300° F. can be safely utilized to power the gas turbine.

Other important advantages also accrue from this invention. For example, centrifugally compressd air is oil free. Hence, the primary combustion air which is mixed with the ammonia does not contaminate the catalyst employed with oil. This makes possible longer periods of catalyst activity before necessity for regeneration of the catalyst, and also results in higher average conversions since the activity of the catalyst is retained at higher levels for longer periods of time. To illustrate this, the maximum period between shut-downs to change catalyst prior to this invention was never more than three weeks, and usually two weeks or even less, whereas the average period between shut-downs for catalyst change is six to eight weeks when employing oil-free primary combustion air in accordance with this invention.

Another advantage of this invention is that centrifugally compressed primary combustion air can be provided to the converter at higher pressures than is available from the presently installed reciprocating compressors, thus making it possible to operate the entire system under higher pressures than heretofore possible, which is advantageous. Since the pressure drop from the converter downstream to the point where secondary air is injected into the system just before the condenser amounts to 15–20 p.s.i.g., it is possible to employ air compressed by the motor-driven reciprocating compressor for secondary air and similarly for tertiary air, even though primary combustion air is pumped into the system at higher pressures. Absorption tower pressure, therefore, is raised, and nitrogen dioxide absorption efficiency is improved considerably as a direct result of the higher absorption tower pressures. Improved absorption efficiency leads to higher acid strength for the same percent of unreacted nitric oxide in the absorption tower exhaust. Additionally, in processes requiring more concentrated nitric acid, the costs for concentration accordingly are reduced. Moreover, with higher initial pressures, and lower system pressure drop, more pressure and therefore more energy is delivered in the spent gas to the gas turbine which powers the centrifugal compressor.

A further very important aspect of this invention resides in the ability to operate an ammonia oxidation system, modernized in accordance with this invention, continuously and efficiently at substantially less than designed plant nitric acid production capacity. The advantage of this aspect of the invention can be more fully appreciated by recognition of the fact that normally a centrifugal compressor can be throttled back from the design point only to about 80% capacity if full air pressure is to be maintained. Any further throttling back of the centrifugal compressor causes it to go into surge. Hence, when turn-down in plant production is required because of lack of acid demand, an ammonia oxidation system based solely on centrifugally compressed air must be operated either at reduced pressure, or intermittently at full design pressure, either of which contributes to higher costs per ton of acid.

In accordance with this invention, however, at any time that the operating level of the ammonia oxidation system must be turned down, it has been discovered that the system can be operated continuously and efficiently at the reduced production level by compressing an amount of air in excess of secondary and tertiary air requirements with a motor-driven reciprocating compressor, augmenting the resultant reduced volume of spent gases from the turned down ammonia oxidation process with this excess reciprocating compressor air, and utilizing the mixture of spent gases reheated by indirect heat exchange by the hot gases of the ammonia oxidation and said excess air as the source of energy to operate the gas turbine at substantially design capacity. The amount of excess air compressed by the reciprocating compressor needs to be sufficient only to maintain the full design flow and pressure on the gases going to the gas turbine and keep the turbine blading filled. Thus, the full design horsepower of the gas turbine is maintained for driving the centrifugal compressor at design capacity, and with this arrangement the centrifugal compressor can be kept on the line at full pressure to about 60% plant turn-down. Moreover, during periods of plant turn-down, some centrifugally compressed air can also be employed to augment the spent gases going to the gas turbine without exceeding the maximum allowable system pressure drops.

The above advantages of augmenting spent gases with compressed air make it possible also to bring the centrifugal compressor up to design rate much more quickly during start-up. More specifically, during start-up centrifugally compressed air can be initially all by-passed to augment spent gases going to the gas turbine as soon as the centrifugal compressor is able to develop 50–60 p.s.i.g. The resultant mixture of hot spent gases and by-pass air delivered to the gas turbine develops more horsepower than is available from reheated spent gas alone and thus allows the centrifugal compressor to be brought up to design rate much more quickly with consequent power savings. Higher annual productive capacity is thus achieved since start-up time can be reduced by 1–1.5 hours each time the system is started up, about once every six to eight weeks.

The invention can be more specifically defined by reference to the attached drawing which is a flow sheet of the improved process.

In accordance with the flow sheet, ammonia under pressure is delivered to a mix tube 12 via line 11 and simultaneously therewith compressed primary combustion air is delivered to the mix tube through line 13. The mixture of ammonia and air containing from about 5% to about 10% by weight of ammonia, preferably about 7% by weight, and at a pressure of at least about 115 p.s.i.g. is then passed via line 14 to a converter 15 where the ammonia is catalytically oxidized by the oxygen in the air by passage through a platinum gauze catalyst in the converter. This reaction is highly exothermic and may be represented by the following formula:

$$4NH_3 + 5O_2 \rightarrow 4NO + 6H_2O \qquad (1)$$

The resulting hot, gaseous products of oxidation containing substantial quantities of nitric oxide and at a temperature of about 1700° F. are then passed via line 16 to a heat exchanger designated as a superheater 17 where they are partially cooled. From the superheater the partially cooled ammonia oxidation gases are passed via line 18 to another heat exchanger designated as a preheater 19 where they are further cooled, thence via line 21 through a filter 22 for catalyst recovery, thence via line 23 to another heat exchanger designated as a reheater 24 where the ammonia oxidation gases are still further cooled. From the reheater the ammonia oxidation gases are passed via line 25 to a condenser 26. Simultaneously compressed secondary air at a pressure of about 115 p.s.i.g. is introduced into the ammonia oxidation gases via valved line 27 to promote oxidation of the nitric oxide present in the ammonia oxidation gases to nitrogen dioxide according to the following reaction:

$$2NO + O_2 \rightarrow 2NO_2 \qquad (2)$$

This secondary air is necessary because there is insufficient oxygen remaining in the ammonia oxidation gases from the primary combustion air to complete the oxidation of nitric oxide to nitrogen dioxide. Although the amount of secondary air required by the process can be expected to vary within limits depending upon the conditions under which the system is being operated, in general the amount of such secondary air will be between about 10% and about 20% by weight of the total air requirements of the process, and preferably about 15%.

In the condenser which is conventionally water cooled, the ammonia oxidation gases are cooled below a temperature at which water vapor in the gases condenses. A small amount of nitrogen dioxide in the ammonia oxidation gases is absorbed in the water condensate in the condenser to produce a weak acidic condensate which is recovered and employed to augment water in the absorber for manufacture of nitric acid. From the condenser the ammonia oxidation gases augmented with secondary air pass via line 27a to an absorbing tower designated as absorber 28 in which the gases are passed in countercurrent contact with water and weak acidic condensate from condenser 26 to produce nitric acid in accordance with the following reaction:

$$3NO_2 + H_2O \rightarrow 2HNO_3 + NO \qquad (3)$$

Simultaneously compressed tertiary air at a pressure of about 115 p.s.i.g. is admitted to the absorber via valved line 29 principally to effect bleaching of the nitric acid by conversion of nitric oxide generated by Reaction 3 to nitrogen dioxide in accordance with Reaction 2 above. It is apparent upon inspection that both Reactions 2 and 3 are favored by increased pressure, and, as noted previously hereinbefore, there is a pressure drop through the system as a result of progressive cooling of the hot ammonia oxidation gases through the several heat exchangers and condenser. Accordingly, introduction of secondary and tertiary air at a pressure of about 115 p.s.i.g. into the system as described tends to overcome the pressure drop from the converter to the absorber and thus maintain suitably high pressures in the absorber. In accordance with this invention, a pressure of at least about 110 p.s.i.g. is maintained in the absorber, and the amount of tertiary air to accomplish the purposes of this invention will, in general, be between about 5% and about 10% by weight of the total air requirements of the process, and preferably about 8%.

Water for the absorption of nitrogen dioxide to produce nitric acid in the absorber is introduced into the absorber via line 31, and this is augmented via line 32 by the weak acidic condensate produced in condenser 26. Nitric acid produced in the absorber is withdrawn from the process via line 33.

The spent gases from the absorber, now at approximately room temperature, are passed via valved line 34 into reheater 24 where they are partially reheated by indirect heat exchange with the ammonia oxidation gases.

Valved line 35 is a by-pass line for by-passing any part or all of the spent gases around the reheater whenever necessary or desired for control purposes. The partially heated spent gases are then transferred via line 36 to the superheater 17 where they are further reheated to a temperature of about 1100° F. by indirect heat exchange with the hot ammonia oxidation gases, and the superheated spent gases are then passed via line 37 as the source of energy to gas turbine 38 which powers a centrifugal compressor 39 to which air is admitted from the atmosphere via line 41. The exhaust gases pass from the turbine through line 42 to other apparatus such as a waste heat boiler (not shown) for recovery of any energy that may remain in them.

The centrifugal compressor 39 compresses all of the primary combustion air and up to about 80° by weight of all air required by the process, except during start-up operations. This compressed air is passed from the centrifugal compressor via valved line 43 into preheater 19 where it is heated by indirect heat exchange by the ammonia oxidation gases to a temperature of about 525° F. and a pressure of about 130 p.s.i.g., and is delivered via line 13 to mix tube 12.

Reciprocating compressor 44, driven by motor 45, provides all secondary and tertiary air required by the process by compressing air from the atmosphere via line 46 to a pressure of about 115 p.s.i.g., and the compressed air passes via line 47, filter 48, and line 49 to air receiver 51. Secondary air for the process is delivered to the system from the air receiver via valved line 27, and tertiary air is similarly delivered to the system via valved line 29.

During start-up operations, primary combustion air is furnished to the system by the motor-driven reciprocating compressor via valved line 52, preheater 19, and line 13, and as soon as reheated spent gases are able to bring the gas turbine-centrifugal compressor combination up to designed operating levels, the valve in line 52 is closed, and some of the units of the motor-driven reciprocating compressor are closed down.

As pointed out previously, during periods of plant turndown when there is insufficient spent gas from the ammonia oxidation to operate the gas turbine-centrifugal compressor combination at design levels, air compressed by the motor-driven reciprocating compressor can be employed to augment the spent gases from the ammonia oxidation and thus maintain the full design volume and pressure on the gases going to the gas turbine. This augmenting air can be introduced into the spent gases via either, or both, of valved lines 53 or 54, as desired or necessary to maintain efficient control of the system. Similarly, during periods of start-up, or during periods of plant turn-down, some centrifugally compressed air may also be employed to augment the volume of spent gases going to the gas turbine, and this centrifugally compressed air may be introduced into the spent gases through either, or both, of valved lines 55 and 56, as desired or necessary to maintain efficient control of the system.

It will be understood by those skilled in the art that the valves in the various air delivery and spent gas lines are conventionally automatically controlled by mechanical and/or electrical control means well known in the art and do not require detailed explanation here.

It is clear from the preceding description that there are many modifications that can be made in the invention by persons skilled in the art without departing from the spirit and scope of the invention. For example, the catalyst recovery filter 22 could be disposed between superheater 17 and preheater 19, or between reheater 24 and condenser 26, instead of between preheater 19 and reheater 24, as shown. Whereas the several heat exchangers have been shown as individual structures in the system, it is within the skill of the art to combine the functions of two or more heat exchangers in one combination structure, as for example, a combination superheater-preheater structure in which part of the structure functions as a superheater and the remaining part of the structure functions as a preheater. Furthermore, the spent gas stream can be augmented with excess compressed air at a different stage of the process than shown by the drawing; for example, the excess air may be introduced into the spent gas prior to its entry into the reheater or, if desired, it can be added to the spent gas at more than one point in the process.

Although this invention is primarily concerned with providing improvements in an existing ammonia oxidation system which now utilizes reciprocating compressors to compress all air required for the system, it is not limited in this respect, for the principle of separating centrifugal compressor air from reciprocating compressor air can be usefully applied to increase the capacity of an ammonia oxidation plant which presently relies on a gas turbine-centrifugal compressor combination for all air requirements. The addition of a motor-driven reciprocating compressor piped to deliver air to the points of entry for secondary and tertiary air in such a plant will allow all of the centrifugal compressed air to be delivered to the converter as primary combustion air. The pressure requirements of the new reciprocating compressor, and consequently the horsepower required, can be scaled to the lower air pressures required for secondary and tertiary air. An increase of as much as one-third in total capacity can be achieved at minimum investment increase and with minimum interruption to the existing process for new equipment installation.

Moreover, the advantages outlined for this invention may be used effectively in a plant modernization where one large new gas turbine-centrifugal compressor combination is installed to furnish primary combustion air to two or more existing converter, heat exchanger, tower systems. By staggering catalyst renewals in such a plant so that only one converter unit at a time is down, the gas turbine-centrifugal compressor combination can be kept continuously on the line with the resulting 50% plant turn-down rate during catalyst renewals with only about a 10% reduction in power recovery efficiency. The mechanical and process advantages in keeping the gas turbine-centrifugal compressor on the line continuously are far more important than the 10% reduction in power recovery efficiency, and the gas turbine-centrifugal compressor unit need be shut down only for scheduled maintenance inspection, i.e., once or twice a year.

What I claim and desire to protect by Letters Patent is:

1. In a process of making nitric acid wherein ammonia mixed with compressed primary combustion air is oxidized under pressure and the products of oxidation are cooled by successive passage through a series of heat exchangers and a condenser and are then contacted in countercurrent flow with water in an absorbing column to produce nitric acid, and wherein compressed secondary air is mixed with said products of oxidation prior to passage through the condenser and compressed tertiary air is introduced into the system at the absorber, the improvement which comprises compressing the primary combustion air, comprising up to about 80% by weight of the total air required by the process, with a centrifugal compressor driven by a gas turbine which derives its power from spent gas from the ammonia oxidation process reheated by indirect heat exchange with the hot gases of the ammonia oxidation, compressing secondary air, comprising about 10% to about 20% by weight of the total air requirements of the process, and tertiary air, comprising about 5% to about 10% by weight of the total air requirements of the process, with a motor-driven reciprocating compressor, and keeping the compressed primary combustion air separated from the compressed secondary and tertiary air.

2. In a process for operating an ammonia oxidation system continuously and efficiently at a turned-down rate substantially less than designed nitric acid production capacity, wherein ammonia mixed with compressed primary combustion air is oxidized under pressure and the products of oxidation are cooled by successive passage through a series of heat exchangers and a condenser and are then contacted in countercurrent flow with water in an absorbing column to produce nitric acid, and wherein compressed secondary air is mixed with said products of oxidation prior to passage through the condenser and compressed tertiary air is introduced into the system at the absorber, the improvement which comprises compressing the primary combustion air, comprising up to about 80% by weight of the total air required by the process, with a centrifugal compressor driven by a gas turbine which derives its power from spent gas from the ammonia oxidation process reheated by indirect heat exchange with the hot gases of the ammonia oxidation, compressing secondary air, comprising about 10% to about 20% by weight of the total air requirements of the process, and tertiary air, comprising about 5% to about 10% by weight of the total air requirements of the process, and an additional quantity of air in excess of secondary and tertiary requirements with a motor-driven reciprocating compressor, keeping the compressed primary combustion air separated from the compressed secondary and tertiary air, mixing said additional quantity of air in excess of secondary and tertiary requirements with the resultant reduced volume of spent gases from the turned-down ammonia oxidation process, and utilizing the mixture of spent gases reheated by indirect heat exchange by the hot gases of the ammonia oxidation and said additional quantity of air in excess of secondary and tertiary requirements as the source of energy to operate the gas turbine at substantially design capacity, said additional quantity of air in excess of secondary and tertiary requirements being sufficient to maintain the full design flow and pressure on the gases going to the gas turbine.

References Cited

UNITED STATES PATENTS

| | | | |
|---|---|---|---|
| 2,850,361 | 9/1958 | Austin | 23—162 X |
| 2,942,953 | 6/1960 | Shields | 23—162 X |
| 2,955,917 | 10/1960 | Roberts et al. | 23—162 |
| 3,003,851 | 10/1961 | Winn | 23—162 |

FOREIGN PATENTS

| | | |
|---|---|---|
| 629,820 | 10/1961 | Canada. |
| 1,354,602 | 1/1964 | France. |

MILTON WEISSMAN, *Primary Examiner.*

B. H. LEVENSON, *Assistant Examiner.*